This invention relates to an artificial tree of the twisted wire and plastic filament type and its method of manufacture.

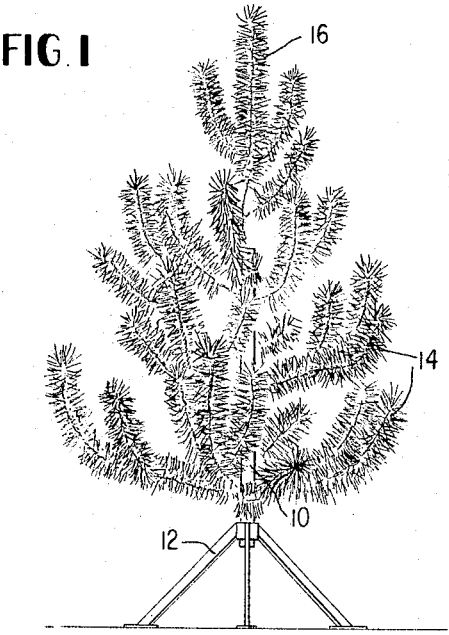
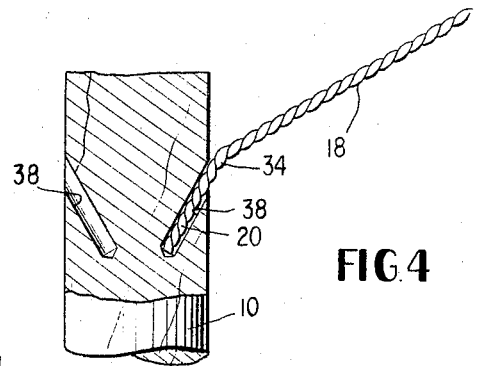
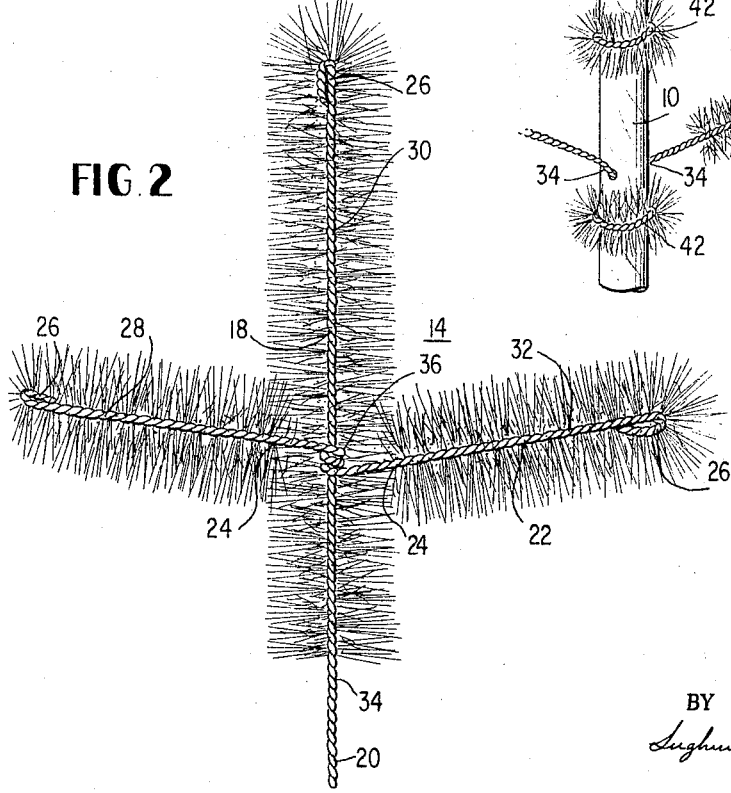
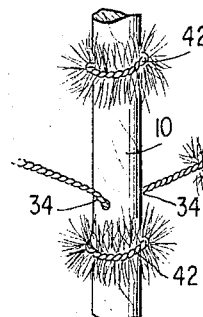
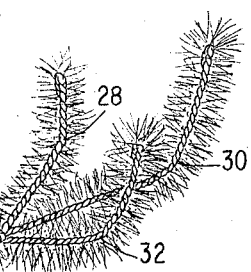
INVENTOR.
PERCY DIEFFENBACH 3,278,364
ARTIFICIAL CHRISTMAS TREE
Percy Dieffenbach, R.D. 1, Olyphant, Pa.
Filed June 10, 1963, Ser. No. 286,668
5 Claims. (Cl. 161—22)

In the past few years, artificial Christmas trees have come into vogue and in many areas are actually replacing the natural Christmas trees due to local scarcity and the relatively high cost of shipping the trees from the more plentiful areas. A great variety of artificial Christmas tree designs have been introduced with the trees being constructed of paper, wood, plastic and metal. Unlike natural trees, in most designs it is necessary to provide a completely symmetrical tree in which, even at first glance, the tree is apparently artificial. In addition, where the trees have been made from metal such as aluminum there has only been a pretense of having the artificial tree look natural. In giving the tree an unsymmetrical look, it is necessary to produce trees of known design by manual procedures involving a great expenditure of time and effort, greatly increasing the cost of the artificial tree as contrasted to a natural tree of the same size and dimensions. In the case of the trees constructed tediously by able craftsmen involving many hours of manual labor, most of the labor is spent in attaching the tree limbs to the trunk to provide a connection having a natural appearance as well as one of stability to prevent the limb from separating from the tree trunk during use or trimming. In such cases, once the attachment between the limb and the trunk has been made the connection is permanent and the tree after use during the Christmas season must be stored in the form used, that is, as a completed tree.

One of the principal problems involved in the manufacture and design of artificial Christmas trees, predominantly in tree construction in which the limbs are readily removable from the trunk to enable dismantling and storage as well as initial set-up, involves maintaining the limbs in predetermined position with respect to the trunk proper. In some artificial tree constructions, it is conventional to drill a series of radial holes within the trunk and to push the inner end of the limb into the hole to provide the desired connection between the limb and the trunk proper. In this manner, if the limb is straight and symmetrical it will be retained in the initial inserted position. However, in artificial tree constructions involving one or more cross limbs extending across or those having lateral projections from the main limb element, the addition of the cross limb or extension presents an imbalance which will tend to rotate the main limb about its axis within the lateral hole formed in the trunk to a point where the imbalance is overcome regardless of whether this is the most desirous position of the limb with respect to the axis of the trunk.

It is, therefore, a principal object of this invention to provide an improved artificial tree structure involving a central vertical trunk and a plurality of radially projecting main limbs in which the main limbs include transverse extensions or cross limbs and in which the main limb will be retained in its inserted position regardless of the imbalance to the limb structure caused by the presence of cross limbs.

It is the further object of this invention to provide an artificial tree structure of the twisted wire and plastic filament type which most nearly approximates a real tree.

It is a further object of this invention to provide an improved artificial tree structure and the method of making the same which may be readily assembled and dismantled and which allows the assembler to modify the position of the outer portions of the limbs with respect to the tree trunk to effect either asymmetrical or non-symmetrical appearance.

Further objects of this invention will be pointed out in the following detailed description and claims and illustrated in the accompanying drawing which discloses, by way of example, the principle of this invention and the best mode which has been contemplated of applying that principle.

In the drawing:

FIG. 1 is an elevational view of a preferred embodiment of this invention providing an artificial Christmas tree structure;

FIG. 2 is a plan view of a representative limb assembly including a main limb and a transverse cross limb prior to simultaneous bending of the cross limbs and the main limb to effect the desired configuration;

FIG. 3 is a perspective elevational view of a portion of the tree shown in FIG. 1 showing the use of ring members on the trunk to disguise the same and the method of connecting the limb assembly shown in FIG. 2 to the tree trunk;

FIG. 4 is an elevational view partially in section of a portion of the elements shown in FIG. 3 showing the method of attachment of the tree limb to the trunk; and FIG. 5 is an elevational view in section of a portion of the tree shown in FIG. 1 showing the method of connecting the tree top from the twisted wire and plastic filament to the terminal end of the tree trunk.

In general, the present invention is directed to an artificial tree and the method of making the same involving the use of a small diameter rod or post as the vertically extending tree trunk. The tree trunk is provided with a series of radial holes which are diagonally drilled on an angle to the axis of the trunk for receiving the inner end of a respective limb assembly of the twisted wire and plastic filament type. The limb assemblies are preferably formed with one central or main limb and at least one cross limb, both formed from twisted wire which holds a great number of filaments at right angles to the axis of the wire in the manner of conventional brush structures. The outer ends of the cross limbs and the outer end of the main limb are bent upwardly while the inner terminal end of the main limb is bent downwardly at a slight angle in a simultaneous operation to produce the desired limb configuration to most approximate a real tree structure. In this manner, regardless of the imbalance caused by presence of the cross limbs, the main limb will not rotate about its axis due to the bent portion occurring between the terminal portion inserted in the diagonal hole in the trunk and the point where the cross limb contacts the main limb element. A series of rings formed from the twisted wire and plastic filament may embrace the trunk intermediate of the limb connections to disguise the symmetrical and smooth trunk. The outer ends of all the elements such as the cross limb, the top or the main limb are bent rearwardly to effect rounded, symmetrical outer ends to the limbs to again more approximate a real tree structure. A single hole is drilled at the top of the trunk and extends vertically thereon to allow the tree top to be inserted in a similar manner to the radial limbs.

Referring to the drawings, there is shown in FIG. 1 an artificial tree structure formed by the method of the present invention to effect the production of an artificial tree which most closely approximates a real tree structure in the form of an evergreen or Christmas tree. With the exception of the cental post 10 and the stand 12 which forms no part of the present invention, the tree is formed completely of brush-like material comprising two or more twisted wires acting to embrace a great number of plastic filaments therebetween with the wire or plastic, or both, being colored green to provide simulated limb elements. It is actually amazing how closely this twisted wire and plastic filament brush material approximates the actual tree limbs or boughs of an evergreen tree.

The tree structure shown in FIG. 1 comprises a plurality of radially projecting limb assemblies 14 and a single top assembly 16 formed from the brush material. Referring to FIG. 2, there is shown the basic limb assembly 14 which comprises essentially a central twisted wire and filament main limb element 18 which may have an inner or terminal portion 20 which is completely free of filaments and provides the means for assembling the limb assembly to the tree trunk 10. To effect a more natural appearance, sections of the twisted wire and filament members such as limb 18 may be provided with areas completely free of filaments or may have filaments of greater or lesser length than other areas to lessen the symmetry of the structure. The representative limb assembly 18 of FIG. 2 includes a single cross limb 22 which is formed of the same material as the main limb 18. It has a central portion indicated at 24 barren of filaments to allow a two-turn wrap of the cross limb 22 around the main limb 18 to produce a completed limb assembly. Both the cross limb 22 and the main limb 18 have a small turned-back or looped portion 26 at the extreme ends of the limb element tending to form a rounded terminal portion which greatly increases the esthetic appeal of the tree and, again, provides a tree structure which more closely approximates a real evergreen tree.

Before the limb assembly 18 can be attached to the tree trunk, it must be bent at several points to effect a two-fold purpose. The first purpose of bending the assembly is to provide a means for connecting the individual limb assemblies to the central post which will prevent the limb assembly 14 from rotating about the axis of the main limb element 18 after insertion or connection to the post 10 so as to produce a tree structure which is completely stable and will remain in the desired shape after assembly. The second purpose is to bend the transverse or cross limbs at one or more points as well as the main limb element 18 to produce a tree limb which most approximates the configuration of a real evergreen limb. Since evergreen limbs in nature do not grow completely straight, the limb assembly 14 as shown in FIG. 1 is bent simultaneously at points indicated at 28, 30, 32 and 34. At the three outer points, 28, 30 and 32, the terminal portions of the limb element are bent upwardly much in the same manner as a natural tree would bend as a result of growth. At the inner end adjacent the tree trunk, the terminal portion of the central limb 18 is bent downwardly for purposes which are most apparent by viewing FIG. 4. By bending the main limb element 18 intermediate of its terminal portion 20 and a point 36 where the cross limb intersects the main limb, regardless of imbalance caused by the connection of the cross limb 22 to the main limb 18, the limb cannot possibly rotate about its axis due to the fact the center of gravity of the limb structure is below an imaginary line drawn along the axis of the opening or hole 38 in which the terminal portion 20 of limb 18 protrudes. In this respect, the holes 38 which allow the insertion of the terminal portions 20 of the limb assembly are drilled diagonally with respect to the longitudinal axis of the trunk 10. The holes 38 may be positioned in some sort of a pattern or may be randomly placed about and along the axis of the trunk 10. The problem of imbalance is not as important with respect to the top of the tree indicated at 16 since there would be no trend for rotation of the limb element 16 about its axis as best seen in FIG. 5. In this case, a vertically extending opening or hole 40 is provided generally along the axis of the trunk 10 allowing for the insertion of the free end of the top assembly 16.

In order to provide an artificial tree structure which most closely approximates the configuration and natural appearance of a real evergreen tree, the method of the present invention includes the positioning of a plurality of ring members 42 along the peripheral surface of the trunk 10 inbetween the points where the tree assembly 14 emerges from the trunk. The rings 42 actually tend to cover the connections between the ends 18 and the holes 38 formed in the trunk and, therefore, act to disguise these connections and aid in the production of an artificial tree structure which closely approximates a real tree. The ring members 42 are formed from the same twisted wire and plastic filament brush material and may be slipped on either end of the trunk member 10 as the tree is assembled. Therefore, the diameter of the ring members 42 is just slightly in excess of that of the trunk 10.

It is obvious from the above description that the tree structure of the present invention and its method of manufacture allow ready assembly of the tree as well as dismantling thereof after use to provide ease in subsequent storage, as well as in shipping of a manufactured tree in its dismantled condition to retail stores for initial sales. A great many other additional features are evident, such as allowing the assembler to bend the main limb elements 18 as well as the cross limbs 22 to any desired configuration to add symmetry to the over-all tree appearance or provide a highly unsymmetrical tree more nearly approximating the real tree structure. At the same time, while the embodiment shown in the drawings includes a plurality of limb assemblies 14 which have but a single cross limb 22, larger tree limb assemblies having two or more cross limb extensions may be utilized. This, of course, adds considerably to the appearance of a large tree since in such a structure the lower limb assemblies would include two or more cross limbs while the limb assemblies near the top of the tree would preferably have but one cross limb and would be relatively short, thereby giving a symmetrical, tapered over-all appearance which is highly desirable in the artificial evergreen tree, especially those used for Christmas decoration purposes.

While the present invention has been described and illustrated in connection with the production of an evergreen tree structure, the features of the present invention may be employed in simulated or artificial tree structures other than those approximating evergreens. At the same time, while the invention has been described as employing a wooden tree trunk and a twisted wire and filament brush limb assembly, these elements are representative only of elements which may be utilized in providing an artificial tree structure of this type.

While there have been shown and described and pointed out the fundamental novel features of the invention as applied to a preferred embodiment, it will be understood that various additions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. An artificial evergreen tree construction of the twisted wire and filament type comprising; a vertically extending rod-like trunk member, the trunk member including a plurality of radial holes directed diagonally upward toward said tree top, a plurality of radially extending limb assemblies formed from twisted wire and filament brush material, each of said limb assemblies having a longitudinal extending main limb element and at least one cross limb extending transversely therefrom, the inner end of said main limb element being inserted within a respective hole in said tree trunk, and said main limb element being bent downwardly intermediate the point of emergence from said hole and the point of connection between said cross limb and said main limb element whereby said bent portion acts, solely in conjunction with said diagonal hole, to prevent rotation of said limb assembly about the axis of said diagonal hole, regardless of the imbalance of said assembly due to the presence of said cross limb.

2. The structure claimed in claim 1 wherein the extreme outer ends of said cross limb and said main limb element is turned rearwardly to provide a rounded terminal portion to said limb elements.

3. The structure as claimed in claim 2 wherein said main limb element and said cross limb are bent upwardly intermediate of said extreme ends and the point of connection between the cross limb and said main limb element to effect a more natural appearance to the artificial evergreen tree structure.

4. The structure as claimed in claim 3 wherein said rod-like trunk member is of constant diameter and said structure further includes a plurality of ring members formed from twisted wire and captured filament of a diameter slightly in excess of the trunk diameter are positioned on said trunk member intermediate of said radially extending limb assembies, said ring members being positioned in random number on said central rod-like trunk member to completely fill the gap between adjacent limbs and to thereby fully camouflage the constant diameter, bare trunk with minimum effort during assembly of said tree structure.

5. The structure as claimed in claim 1 wherein said cross limb is formed of a single element of twisted wire and filament-type brush member having filaments extending radially of said twisted wire, captured thereby, throughout the length of said cross limb but with the central portion of said member being free of filament, said filament-free center portion being wrapped at least several times about the axis of said main limb element to connect said cross limb thereto with sufficient rigidity to prevent said cross limb from rotating about the axis of said main limb element.

References Cited by the Examiner
UNITED STATES PATENTS

| | | | |
|---|---|---|---|
| 255,902 | 4/1882 | Wengenroth | 161—23 X |
| 1,594,414 | 8/1926 | Glover | 161—23 X |
| 2,893,149 | 7/1959 | Reece et al. | 161—24 |
| 3,085,465 | 4/1963 | Hellrich | 161—22 |

FOREIGN PATENTS 518,395  4/1955  Italy.

JACOB H. STEINBERG, *Primary Examiner.*

ALEXANDER WYMAN, *Examiner.*